United States Patent
Nakasugi

[19]
[11] Patent Number: 6,031,651
[45] Date of Patent: Feb. 29, 2000

[54] SCANNING OPTICAL APPARATUS

[75] Inventor: Mikio Nakasugi, Tama, Japan

[73] Assignee: Canon Kabushiki Kaisha, Tokyo, Japan

[21] Appl. No.: 08/961,279

[22] Filed: Oct. 30, 1997

Related U.S. Application Data

[63] Continuation of application No. 08/812,157, Mar. 6, 1997, abandoned, which is a continuation of application No. 08/447,005, May 22, 1995, abandoned.

[30] Foreign Application Priority Data

May 24, 1994 [JP] Japan ..................................... 6-133703

[51] Int. Cl.[7] .................................................. G02B 26/08
[52] U.S. Cl. .................... 359/200; 359/198; 359/216; 347/260; 310/90.5; 384/121
[58] Field of Search ..................... 359/198–200, 359/216–219; 310/90, 90.5; 384/100, 107, 114, 121; 347/259–261

[56] References Cited

U.S. PATENT DOCUMENTS

| | | |
|---|---|---|
| 4,726,640 | 2/1988 | Iwama et al. . |
| 5,019,738 | 5/1991 | Weilbach et al. .................... 310/90.5 |
| 5,069,515 | 12/1991 | Itami et al. .............................. 359/200 |
| 5,270,737 | 12/1993 | Nakasugi et al. . |

FOREIGN PATENT DOCUMENTS

| | | |
|---|---|---|
| 0107414 | 5/1984 | European Pat. Off. . |
| 0528274 | 2/1993 | European Pat. Off. . |
| 61-259224 | 11/1986 | Japan . |

*Primary Examiner*—James Phan
*Attorney, Agent, or Firm*—Fitzpatrick, Cella, Harper & Scinto

[57] ABSTRACT

A scanning optical apparatus has a stationary shaft and a rotary sleeve rotatably fitting to each other. The apparatus is arranged to deflection-scan a light beam by rotating a rotary polygon mirror attached to the rotary sleeve. In the apparatus a second permanent magnet, which is repulsive to a first permanent magnet mounted on the stationary shaft, is disposed on a lower end side of the rotary sleeve. Further, a third permanent magnet is placed on a base to which the stationary shaft is fixed so that the third magnet can provide a repulsive force in a direction to urge the second permanent magnet toward the first permanent magnet.

48 Claims, 5 Drawing Sheets

SCANNING OPTICAL APPARATUS

This application is a continuation of application Ser. No. 08/812,157 filed Mar. 6, 1997, now abandoned, which was a continuation of application Ser. No. 08/447,005 filed May 22, 1995, now abandoned.

BACKGROUND OF THE INVENTION

1. Field of the Invention

The present invention relates to a scanning optical apparatus having a rotary polygon mirror for scanning a light beam such as a laser beam on a photosensitive member.

2. Related Background Art

In these years, the scanning optical apparatus of this type is required to rotate the polygon mirror at high speed or at high accuracy, and particularly, laser beam printer apparatus use a bearing rotating apparatus rotating in non-contact in order to achieve a high-accuracy deflection-scanning apparatus.

In the bearing rotating apparatus for rotating the rotary polygon mirror used in the conventional scanning optical apparatus, as shown in FIG. 1, a stationary shaft 2 of a ceramic material is standing from a housing 1 mounted on a frame or the like, a rotary sleeve 4 made of a ceramic material with a drive magnet 3 attached thereto is rotatably fit over the stationary shaft 2, and a rotary polygon mirror 6 is fixed by a spring 5 to the rotary sleeve 4. On the housing 1 there is a base 8 to which a stator 7 is mounted at a position opposite to the drive magnet 3, thus constituting a drive motor for rotating the rotary sleeve 4.

Further, a permanent magnet 9 is attached to the lower end of the rotary sleeve 4, and a second permanent magnet 10 is fixed to a lower portion of the stationary shaft 2 so as to be vertically opposed to the permanent magnet 9 and to be repulsive thereto, thus supporting a load in the thrust direction by repulsion between the permanent magnets 9, 10.

Once the driving motor is driven, an air membrane is formed between the rotary sleeve 4 and the stationary shaft 2. This air membrane supports the rotary sleeve 4 in the radial direction, and the rotary sleeve 4 and rotary polygon mirror 6 can rotate in non-contact.

Since the thrust bearing was kept floating only by a repulsive force between the pair of permanent magnets in the scanning optical apparatus as in the above-described conventional example, the apparatus, however, had such defects that thrust bearing stiffness was low, that accuracy of height position of the rotary sleeve could not be enhanced so much, and that control of a motion in the thrust direction due to disturbance etc. was difficult.

SUMMARY OF THE INVENTION

An object of the present invention is to provide a scanning optical apparatus, solving the above problems, which is improved in thrust bearing stiffness of the driving motor and which is enhanced in height position accuracy of the rotary sleeve.

A scanning optical apparatus according to the present invention for achieving the above object is a scanning optical apparatus, having a stationary shaft and a rotary sleeve rotatably fit to each other, for deflection-scanning a light beam by rotating a rotary polygon mirror attached to the rotary sleeve, in which a second permanent magnet as repulsive to a first permanent magnet mounted on the stationary shaft is disposed on a lower end side of the rotary sleeve and in which a third permanent magnet for providing a repulsive force in a direction to urge the second permanent magnet toward the first permanent magnet is placed on a base to which the stationary shaft is fixed.

The scanning optical apparatus having the above-described structure urges the second permanent magnet provided on the rotary sleeve toward the first permanent magnet provided on the stationary shaft by repulsion between the second permanent magnet and the third permanent magnet.

DETAILED DESCRIPTION OF THE PREFERRED EMBODIMENTS

The present invention will be described in detail based on the embodiments as shown in FIG. 2 to FIG. 7.

Figure 2:
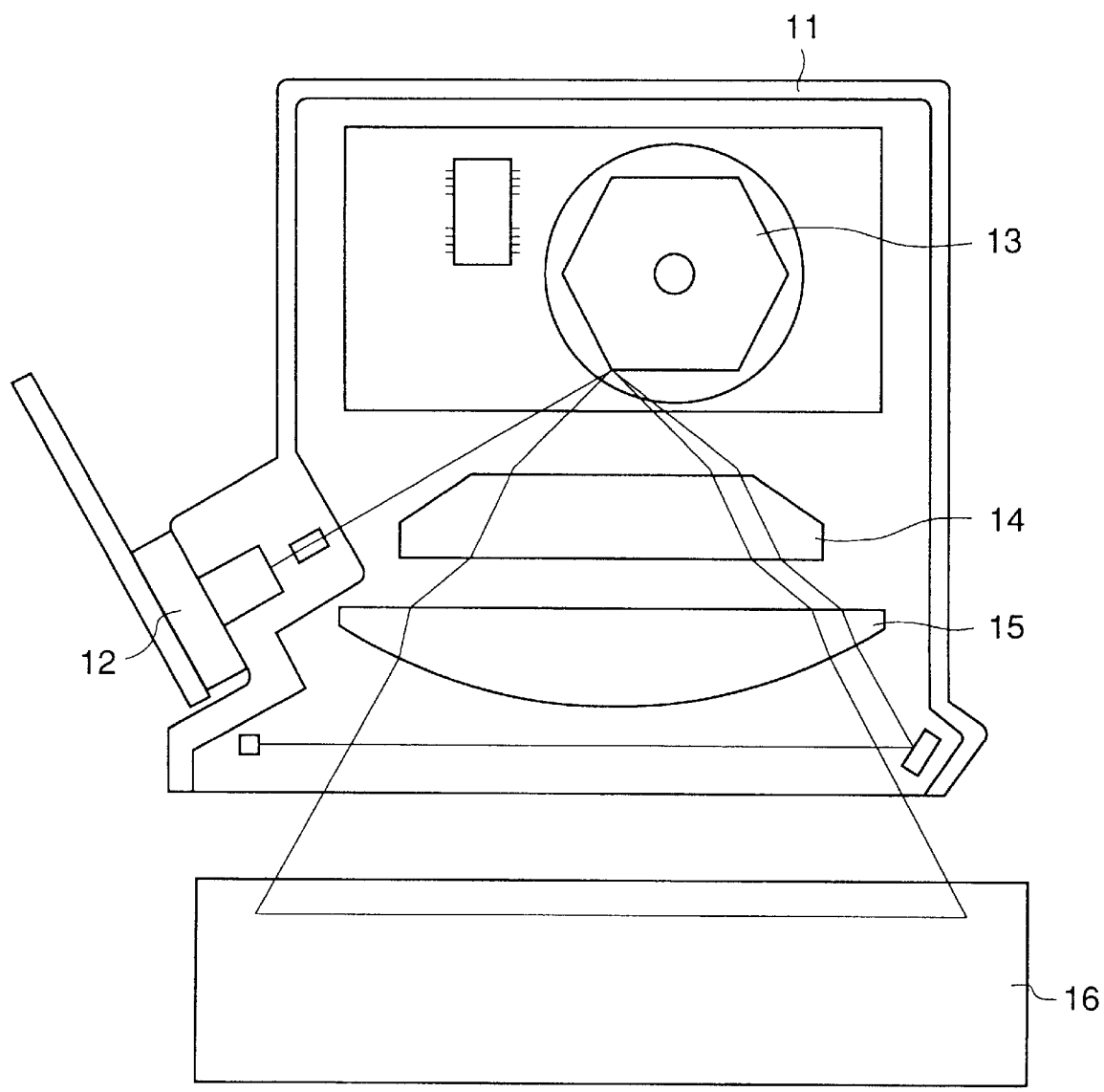
FIG. 2 is an overall structural drawing of a laser beam printer apparatus using the scanning optical apparatus of the present invention.

FIG. 2 is a structural drawing of the whole of a laser beam printer apparatus using the scanning optical apparatus of the present invention, in which laser light emitted from a laser unit 12 provided on a frame 11 is deflection-scanned by a rotary polygon mirror 13 so as to be focused through image-forming lenses 14, 15 on a photosensitive member 16 as a recording medium.

Figure 3:
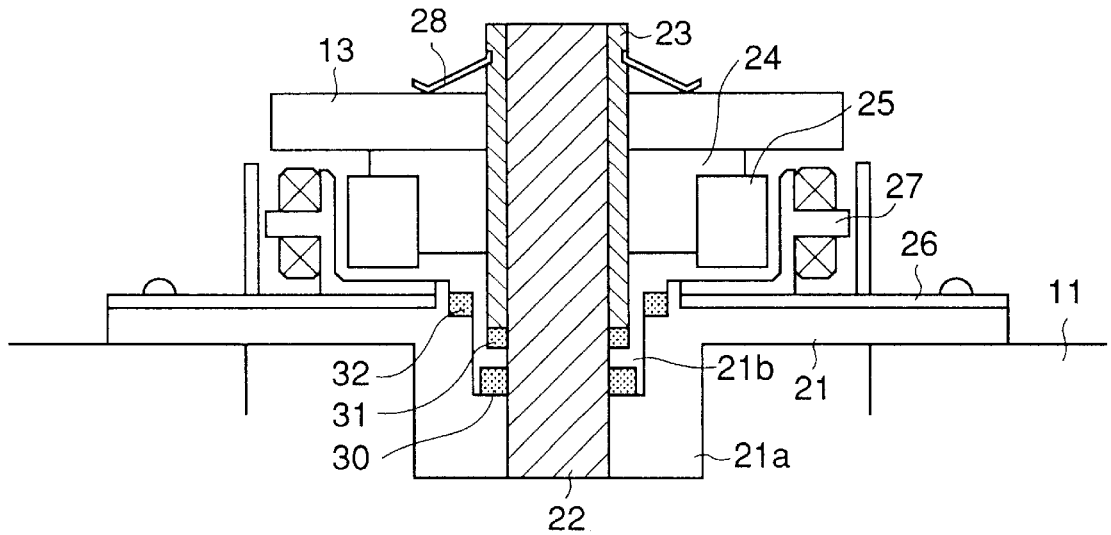
FIG. 3 is a major part structural drawing of a first embodiment of the bearing rotating apparatus for rotating the rotary polygon mirror according to the present invention.

FIG. 3 is a major part structural drawing of a first embodiment of the bearing rotating apparatus of the present invention, for rotating the above-described rotary polygon mirror 13. A motor housing (base) 21 mounted on the frame 11 of the scanning optical apparatus has a shaft supporting portion 21a projecting downward, and the lower end of a vertical, stationary shaft 22 made of a ceramic is fixed in a tubular recess 21b provided in the shaft supporting portion 21a. A ceramic rotary sleeve 23 in a length for the lower end thereof to reach inside the tubular recess 21b is fit over the stationary shaft 22 so as to be rotatable relative to the stationary shaft 22, and a flange 24 made of a non-magnetic metal material such as aluminum or brass is attached to the rotary sleeve 23, for example, by shrinkage fit. Also, a drive magnet 25 is attached to the periphery of flange 24 by means of adhesion.

A motor base 26 on which electric components are mounted is attached to the top surface of motor housing 21, and a stator 27 opposed to the drive magnet 25 is set on the base 26 so as to constitute a drive motor. A rotary polygon mirror 13 is fit on the rotary sleeve 23, and is fixed by a plate spring 28 on the top surface of flange 24.

A first permanent magnet 30 formed in a ring shape is attached to a lower part of stationary shaft 22 at a position below a second permanent magnet 31 attached to the rotary sleeve 23 and at a position in contact with an inner bottom surface of the tubular recess 21b in the shaft supporting portion 21a. The second permanent magnet 31 of a same cross section as the rotary sleeve 23 is attached to the lower end of the rotary sleeve 23 so as to be repulsive to the first permanent magnet. Further, a third permanent magnet 32 is attached to the housing 21 at a position above the second permanent magnet 31 and at the upper edge of the tubular recess 21b in the shaft supporting portion 21a above the first permanent magnet 30 in such an orientation that a repulsive force thereof urges the second permanent magnet 31 toward the first permanent magnet 30. Thus, the third permanent magnet 32 is repulsive to the second permanent magnet 31.

Figure 4:
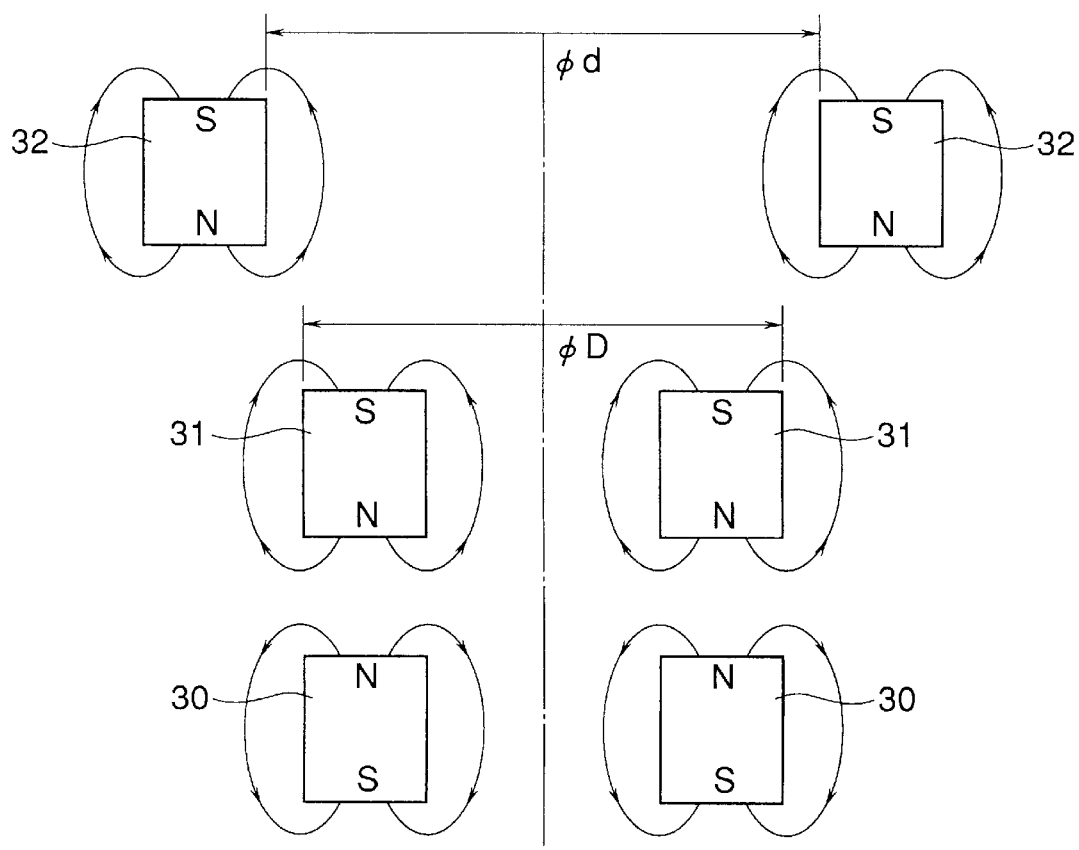
FIG. 4 is an explanatory drawing of arrangement of permanent magnets.

Here, because the third permanent magnet 32 is located at the upper edge of the tubular recess 21b formed in the housing 21, the inner diameter φd thereof is larger than the outer diameter φD of the rotary sleeve 23 and second permanent magnet 31. Because of this, in order to make the repulsive force acting in the direction to urge the second permanent magnet 31 toward the first permanent magnet 30, such a magnetic pole arrangement needs to be set, for example as shown in FIG. 4, that the first and second permanent magnets 30, 31 are set with the N poles thereof opposed to each other and that the third permanent magnet 32 has the inner diameter φd larger than the outer diameter φD of the second permanent magnet 31 and is arranged with the N pole thereof facing down. The same effect can be achieved by the completely inverted pole arrangement of the N and S poles of the three permanent magnets.

In the scanning optical apparatus constructed in the above arrangement, when the rotary sleeve rotates under drive of the driving motor, laser light emitted from the laser unit 12 is deflected by the rotary polygon mirror 13 and is focused by the image-forming lenses 14, 15 at a predetermined position on the photosensitive member 16 in a laser beam printer attached to this apparatus.

An air membrane is formed between the rotary sleeve 23 and the stationary shaft 22 to support the rotary sleeve 23 in non-contact in the radial direction. On the other hand, the repulsive force between the first and second permanent magnets 30, 31 keeps the rotary body floating in a completely non-contact state with respect to the stationary side in the thrust direction. Further, because the third permanent magnet 32 urges the second permanent magnet 31 toward the first permanent magnet 30, the repulsive force in the thrust direction is reinforced so as to increase the thrust bearing stiffness, to enhance the position accuracy of the rotary sleeve 23 in the thrust direction, and to restrict a motion in the thrust direction due to thrust load variations or disturbance by the bi-directional repulsive forces to stabilize the motion.

Since the stationary shaft 22 and rotary sleeve 23 each are made of a ceramic, a possibility of scuffing or the like is low even if they come into contact with each other because of mixing of dust or vibration during high-speed rotation. If high-strength silicon nitride ($Si_3N_4$) is used among ceramics, the possibility of wear or scuffing can be further reduced.

Figure 5:
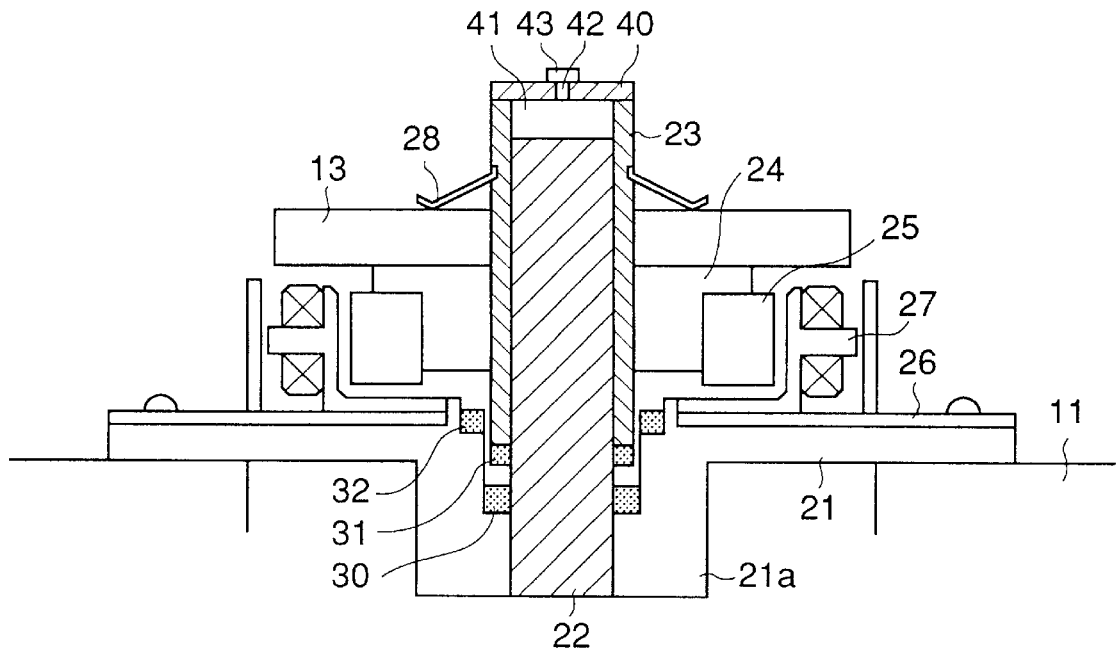
FIG. 5 is a major part structural drawing of a second embodiment of the bearing rotating apparatus for rotating the rotary polygon mirror according to the present invention.

FIG. 5 shows a second embodiment of the bearing rotating apparatus of the present invention. Members having the same functions as those in the first embodiment are denoted by the same reference numerals and the description thereof will be omitted herein. A cover member 40 covering the top of the stationary shaft 22 is disposed at the upper end of the rotary sleeve 23 in the first embodiment, and an air reservoir 41 is formed among the cover member 40, the rotary sleeve 23, and the stationary shaft 22. An air vent hole 42 is formed through the cover member 40, and a sealing plug 43 is coupled to the hole 42.

When the rotary sleeve 23 is brought into fit over the stationary shaft 22, the sealing plug 43 is kept in a taken-off state after fit, the hole 42 is sealed by the sealing plug 43, thus forming the air reservoir 41 among the upper end of the stationary shaft 22, the rotary sleeve 23, and the cover member 40. Since the air reservoir 41 works as an air damper even with application of an external force, which would vertically vibrate the rotary sleeve 23, the motion of the rotary sleeve 23 in the thrust direction can be further suppressed. The second embodiment can also be applied to the laser beam printer apparatus as described with FIG. 2 like the first embodiment.

Figure 6:
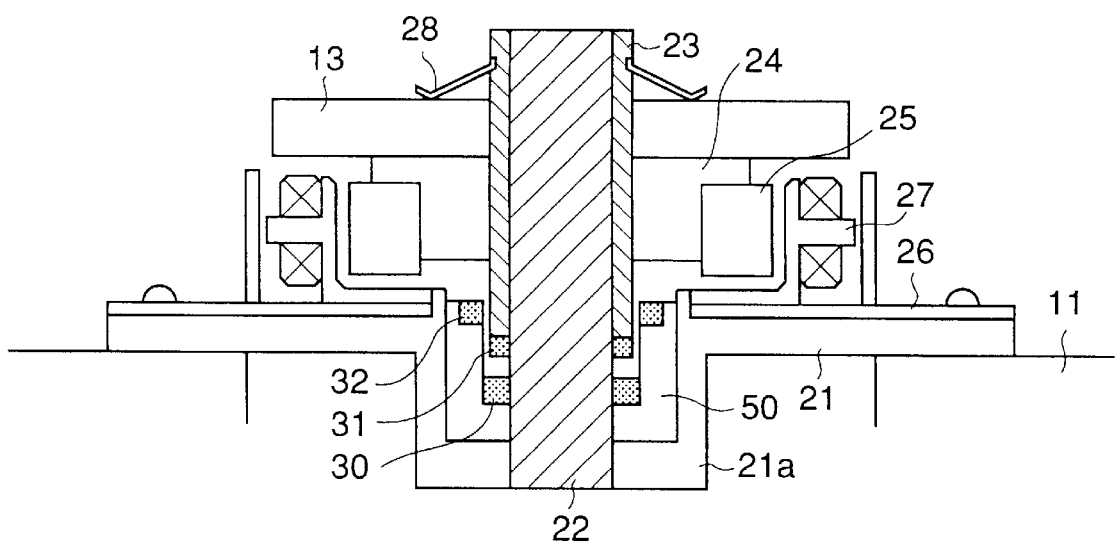
FIG. 6 is a major part structural drawing of a third embodiment of the bearing rotating apparatus for rotating the rotary polygon mirror according to the present invention.

FIG. 6 shows a third embodiment of the bearing rotating apparatus of the present invention. Members having the same functions as those in the first embodiment are denoted by the same reference numerals and the description thereof is omitted herein. In the present embodiment, the first permanent magnet 30 and third permanent magnet 32 in the first embodiment are fit through a cylindrical magnet mounting member 50 in the tubular recess 21b in the shaft supporting portion 21a, whereby the first, second, and third permanent magnets 30, 31, 32 are set in the same positional relation as in the first embodiment. The first permanent magnet 30 and third permanent magnet 32 are attached to a same member, i.e., the magnet mounting member 50.

By this arrangement, the distance relation between the first permanent magnet 30 and the second permanent magnet 31 can be set at high accuracy, because it is determined only by machining accuracy of the magnet mounting member 50. Thus, the position accuracy in the thrust direction can also be enhanced. The third embodiment can also be applied to the laser beam printer apparatus as described with FIG. 2 like the first embodiment.

Although the first to third embodiments were described with the examples of inner rotor type scanning optical apparatus advantageous for high-speed rotation, the present invention can be applied to apparatus of the outer rotor type or the face-to-face type as well.

Figure 7:
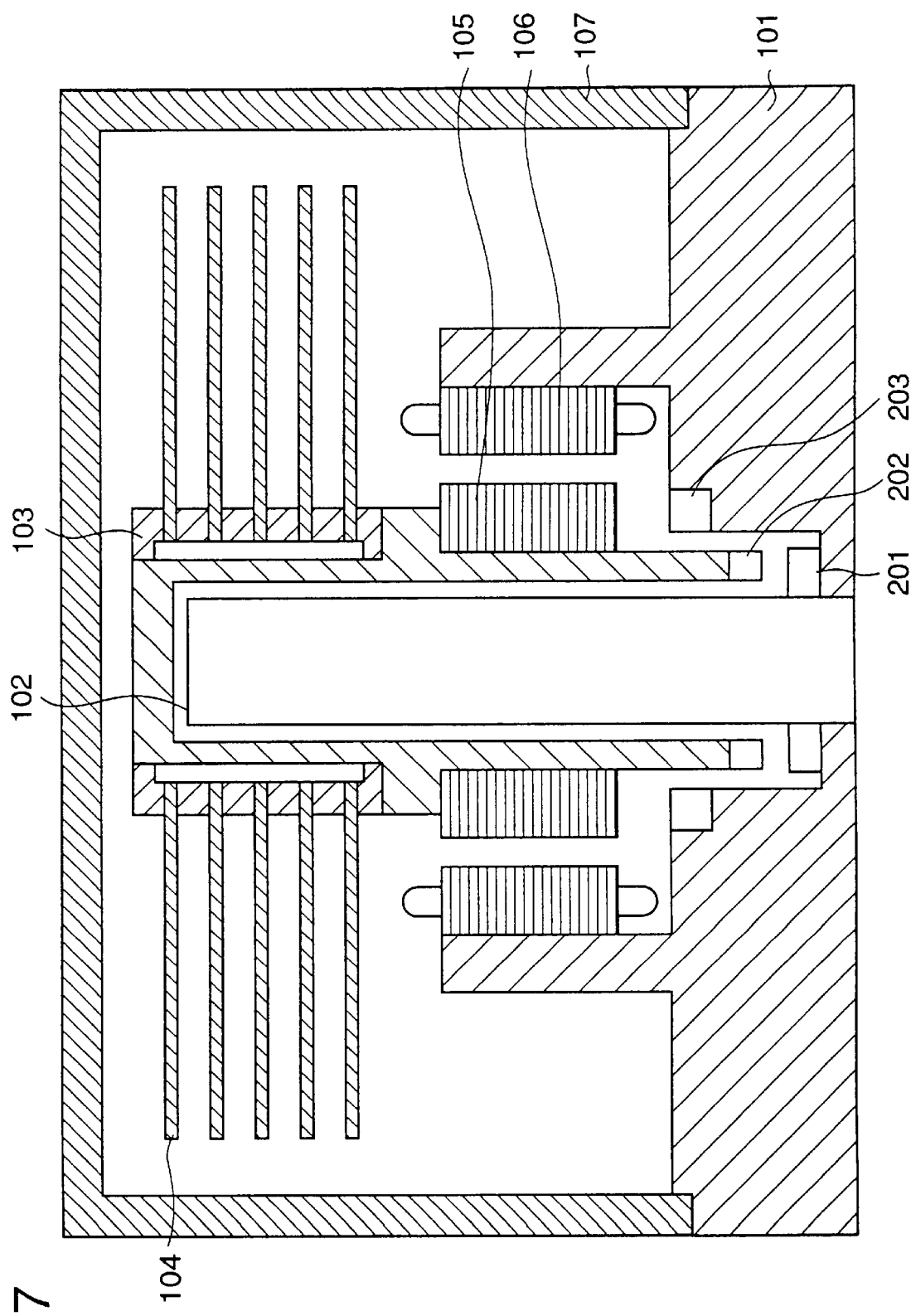
FIG. 7 is a major part structural drawing of a fourth embodiment in which the bearing rotating apparatus of the present invention is applied to a magnetic disk driving apparatus.

FIG. 7 is a major part structural drawing of a fourth embodiment in which the bearing rotating apparatus of the present invention is applied to a magnetic disk driving apparatus (HDD).

A stationary shaft 102 is attached to a base 101, and a cylindrical rotary sleeve 103 is provided to fit over the stationary shaft 102. Magnetic disks 104 are mounted on the upper part of rotary sleeve 103. A rotor 105 is attached to the lower part of the rotary sleeve 103 so as to be opposed to a stator coil 106 attached to the base 101. Then these members are covered by a case 107.

A second permanent magnet 202 is attached to the lower end of the rotary sleeve 103 with the magnetic disks 104 attached thereto, and a first permanent magnet 201 is attached to a lower part of the stationary shaft 102 so as to be repulsive to the permanent magnet 202. Further, a third permanent magnet 203 acting as to urge the second permanent magnet 202 toward the first permanent magnet 201 by its repulsive force is attached to the base 101. Since the third permanent magnet 203 urges the second permanent magnet 202 toward the first permanent magnet 201, the repulsive force in the thrust direction is reinforced so as to increase the thrust bearing stiffness.

As described above, because the bearing rotating apparatus according to the present invention is so arranged that the third permanent magnet provided on the base gives the repulsive force in the direction to urge the second permanent magnet provided on the rotary sleeve in the driving motor toward the first permanent magnet provided on the stationary shaft, the repulsive force is reinforced so as to increase the thrust bearing stiffness and the motion of the rotary sleeve due to disturbance can be restricted in the thrust direction, thus enhancing the height position accuracy.

What is claimed is:

1. A scanning optical apparatus for deflection-scanning a light beam, comprising:

a stationary shaft;

a rotary sleeve rotatably fitting with said stationary shaft;

a second permanent magnet provided on a lower side of said rotary sleeve;

a first permanent magnet provided below and near to said second permanent magnet;

a base to which said stationary shaft is fixed;

a third permanent magnet provided above and near to said second permanent magnet;

driving means for rotating said rotary sleeve; and a deflector attached to said rotary sleeve, for deflection-scanning a light beam.

2. A apparatus according to claim 1, wherein said deflector in a rotary polygon mirror.

3. An apparatus according to claim 1, wherein said first permanent magnet is provided on said base.

4. An apparatus according to claim 1, wherein said third permanent magnet provides a force in a direction to urge said second permanent magnet toward said first permanent magnet.

5. An apparatus according to claim 1, wherein said first permanent magnet and said third permanent magnet are attached to a same member.

6. An apparatus according to claim 5, wherein said same member is said base.

7. An apparatus according to claim 1 further comprising a cover member provided at an upper end of said rotary sleeve, for covering said stationary shaft so as to form an air reservoir.

8. An apparatus according to claim 1, wherein said stationary shaft and said rotary sleeve are made of a ceramic material.

9. An apparatus according to claim 1, wherein said stationary shaft and said rotary sleeve are made of silicon nitride.

10. An apparatus according to claim 1, wherein an inner diameter of said third permanent magnet is greater than an outer diameter of said rotary sleeve and an outer diameter of said second permanent magnet.

11. A bearing rotating apparatus comprising:

a stationary shaft;

a rotary sleeve rotatably fitting with said stationary shaft;

a second permanent magnet provided on a lower side of said rotary sleeve;

a first permanent magnet provided below and near to said second permanent magnet;

a base to which said stationary shaft is fixed;

a third permanent magnet provided above and near to said second permanent magnet; and driving means for rotating said rotary sleeve.

12. An apparatus according to claim 11, wherein said first permanent magnet is provided on said base.

13. An apparatus according to claim 11, wherein said third permanent magnet provides a force in a direction to urge said second permanent magnet toward said first permanent magnet.

14. An apparatus according to claim 11, wherein said first permanent magnet and said third permanent magnet are attached to a same member.

15. An apparatus according to claim 14, wherein said same member is said base.

16. An apparatus according to claim 11 further comprising a cover member provided at an upper end of said rotary sleeve, for covering said stationary shaft so as to form an air reservoir.

17. An apparatus according to claim 11, wherein said stationary shaft and said rotary sleeve are made of a ceramic material.

18. An apparatus according to claim 11, wherein said stationary shaft and said rotary sleeve are made of silicon nitride.

19. An apparatus according to claim 11, wherein an inner diameter of said third permanent magnet is greater than an outer diameter of said rotary sleeve and an outer diameter of said second permanent magnet.

20. A bearing apparatus comprising:

a stationary shaft;

a rotary sleeve rotatably fitting with said stationary shaft;

a second permanent magnet provided on a lower side of said rotary sleeve;

a first permanent magnet provided below and near to said second permanent magnet;

a base to which said stationary shaft is fixed; and a third permanent magnet provided above and near to said second permanent magnet.

21. An apparatus according to claim 20, wherein said first permanent magnet is provided on said base.

22. An apparatus according to claim 20, wherein said third permanent magnet provides a force in a direction to urge said second permanent magnet toward said first permanent magnet.

23. An apparatus according to claim 20, wherein said first permanent magnet and said third permanent magnet are attached to a same member.

24. A apparatus according to claim 23, wherein said same member is said base.

25. An apparatus according to claim 20 further comprising a cover member provided at an upper end of said rotary sleeve, for covering said stationary shaft so as to form an air reservoir.

26. An apparatus according to claim 20, wherein said stationary shaft and said rotary sleeve are made of a ceramic material.

27. An apparatus according to claim 20, wherein said stationary shaft and said rotary sleeve are made of silicon nitride.

28. An apparatus according to claim 20, wherein an inner diameter of said third permanent magnet is greater than an outer diameter of said rotary sleeve and an outer diameter of said second permanent magnet.

29. A scanning optical apparatus for deflection-scanning a light beam, comprising:

a stationary shaft;

a rotary sleeve rotatably fitting with said stationary shaft;

a second permanent magnet provided on a lower side of said rotary sleeve;

a first permanent magnet provided below and near to said second permanent magnet;

a base to which said stationary shaft is fixed;

a third permanent magnet provided above and near to said second permanent magnet;

driving means for rotating said rotary sleeve;

a light source; and a deflector attached to said rotary sleeve, for deflection-scanning the light beam from said light source.

30. An apparatus according to claim 29, wherein said deflector is a rotary polygon mirror.

31. An apparatus according to claim 29, wherein said first permanent magnet is provided on said base.

32. An apparatus according to claim 29, wherein said third permanent magnet provides a force in a direction to urge said second permanent magnet toward said first permanent magnet.

33. An apparatus according to claim 29, wherein said first permanent magnet and said third permanent magnet are attached to a same member.

34. An apparatus according to claim 33, wherein said same member is said base.

35. An apparatus according to claim 34, wherein said stationary shaft and said rotary sleeve are made of silicon nitride.

36. An apparatus according to claim 33, wherein said stationary shaft and said rotary sleeve are made of a ceramic material.

37. An apparatus according to claim 33 further comprising a cover member provided at an upper end of said rotary sleeve, for covering said stationary shaft so as to form an air reservoir.

38. An apparatus according to claim 29, wherein an inner diameter of said third permanent magnet is greater than an outer diameter of said rotary sleeve and an outer diameter of said second permanent magnet.

39. A laser beam printer apparatus comprising:

a stationary shaft;

a rotary sleeve rotatably fitting with said stationary shaft;

a second permanent magnet provided on a lower side of said rotary sleeve;

a first permanent magnet provided below and near to said second permanent magnet;

a base to which said stationary shaft is fixed;

a third permanent magnet provided above and near to said second permanent magnet;

driving means for rotating said rotary sleeve;

a light source;

a deflector attached to said rotary sleeve, for deflection-scanning a light beam from said light source; and a photosensitive member for receiving the light beam deflection-scanned by said deflector.

40. An apparatus according to claim 39, wherein said deflector is a rotary polygon mirror.

41. An apparatus according to claim 39, wherein said first permanent magnet in provided on said base.

42. An apparatus according to claim 39, wherein said third permanent magnet provides a force in a direction to urge said second permanent magnet toward said first permanent magnet.

43. An apparatus according to claim 39, wherein said first permanent magnet and said third permanent magnet are attached to a same member.

44. An apparatus according to claim 43, wherein said same member is said base.

45. An apparatus according to claim 39 further comprising a cover member provided at an upper end of said rotary sleeve, for covering said stationary shaft so as to form an air reservoir.

46. An apparatus according to claim 39, wherein said stationary shaft and said rotary sleeve are made of a ceramic material.

47. An apparatus according to claim 39, wherein said stationary shaft and said rotary sleeve are made of silicon nitride.

48. An apparatus according to claim 39, wherein an inner diameter of said third permanent magnet is greater than an outer diameter of said rotary sleeve and an outer diameter of said second permanent magnet.

* * * * *

UNITED STATES PATENT AND TRADEMARK OFFICE
CERTIFICATE OF CORRECTION

PATENT NO. : 6,031,651

DATED : February 29, 2000

INVENTOR(S) : MIKIO NAKASUGI

Figure 1:
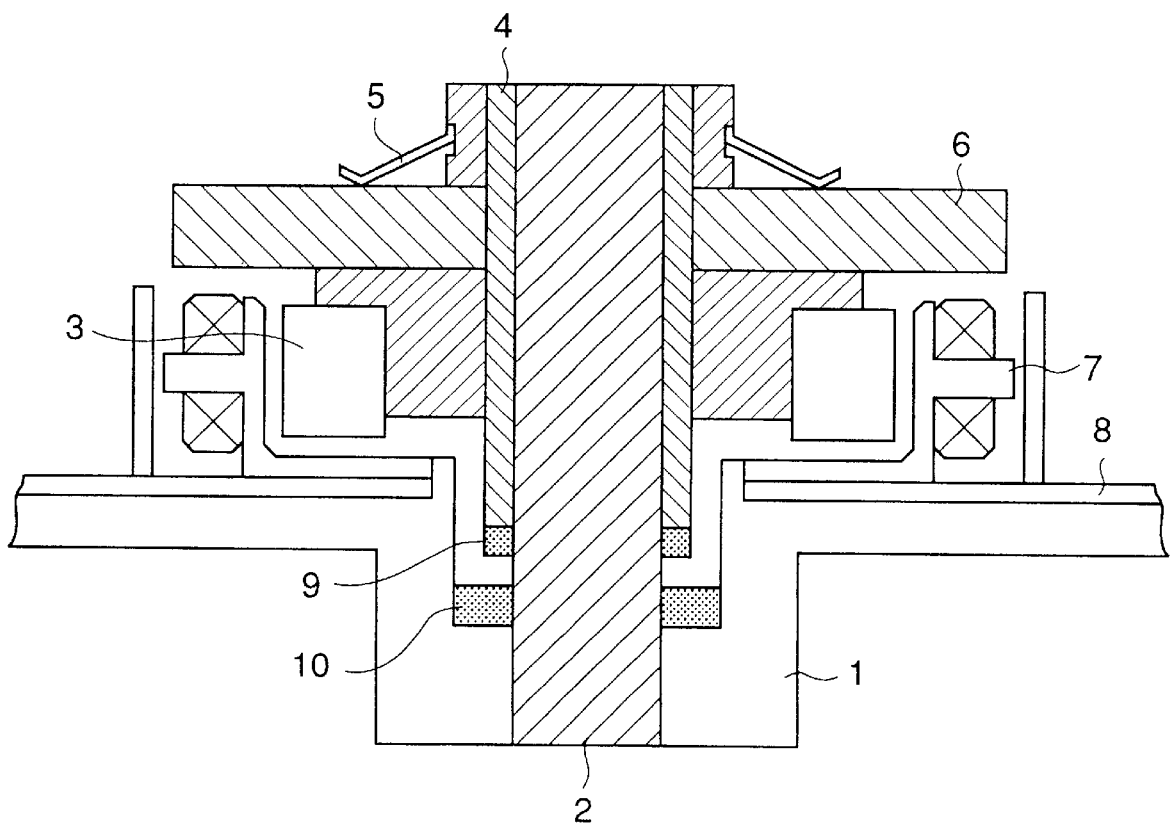
FIG. 1 is a major part structural drawing of a conventional bearing rotating apparatus for rotating a rotary polygon mirror.

It is certified that error appears in the above-identified patent and that said Letters Patent is hereby corrected as shown below:

SHEET 1:
    FIG. 1 should be labelled --PRIOR ART--.

COLUMN 4:
    Line 65, "as" should read --so as--.

COLUMN 5:
    Line 32, "A" should read --An--; and
    Line 33, "in" should read --is--.

COLUMN 6:
    Line 49, "A" should read --An--.

Signed and Sealed this

Seventeenth Day of April, 2001

Attest:

NICHOLAS P. GODICI

Attesting Officer      Acting Director of the United States Patent and Trademark Office